US008733679B2

(12) United States Patent
Camitta

(10) Patent No.: US 8,733,679 B2
(45) Date of Patent: May 27, 2014

(54) SHREDDER AND SHREDDING METHOD FOR VEGETATIVE MATERIAL

(76) Inventor: Joshua Camitta, Stuart, FL (US)

( * ) Notice: Subject to any disclaimer, the term of this patent is extended or adjusted under 35 U.S.C. 154(b) by 184 days.

(21) Appl. No.: 13/402,075

(22) Filed: Feb. 22, 2012

(65) Prior Publication Data

US 2013/0214068 A1 Aug. 22, 2013

(51) Int. Cl.
*A47J 43/00* (2006.01)

(52) U.S. Cl.
USPC .......................... 241/30; 241/169.1; 241/89.4

(58) Field of Classification Search
USPC ............. 241/24.16, 24.6, 25, 33, 168–169.1, 241/278.1, 89.4, 95
See application file for complete search history.

(56) References Cited

U.S. PATENT DOCUMENTS

| | | | | |
|---|---|---|---|---|
| 3,683,938 | A * | 8/1972 | Rowland | 131/240.1 |
| 3,858,815 | A * | 1/1975 | Black | 241/168 |
| 4,111,212 | A | 9/1978 | Bakker | |
| 4,304,363 | A | 12/1981 | Atkielski | |
| 4,417,631 | A * | 11/1983 | Johnson | 177/210 FP |
| 4,605,175 | A | 8/1986 | Weber | |
| 4,789,106 | A | 12/1988 | Weber | |
| 4,858,709 | A * | 8/1989 | Stahl | 177/164 |
| 5,174,403 | A | 12/1992 | Geiger | |
| 5,329,069 | A * | 7/1994 | Amsel et al. | 177/245 |
| 5,386,944 | A * | 2/1995 | Knepler et al. | 241/6 |
| 5,522,556 | A | 6/1996 | Knepler et al. | |
| 5,603,458 | A * | 2/1997 | Sandolo | 241/34 |
| 6,834,817 | B2 * | 12/2004 | Manson | 241/169.1 |
| 6,966,510 | B2 * | 11/2005 | Pai | 241/169.1 |
| 7,367,519 | B2 * | 5/2008 | de Groote et al. | 241/169.1 |
| 7,422,170 | B2 * | 9/2008 | Bao | 241/168 |
| 2009/0224088 | A1 * | 9/2009 | Ruzycky | 241/169.1 |

* cited by examiner

*Primary Examiner* — Mark Rosenbaum
*Assistant Examiner* — Onekki Jolly

(57) ABSTRACT

A shredder has a first plate and a second plate. The first plate is mounted in a housing. The plates each have on one of their faces a number of teeth. The first plate and the second plate are relatively rotated for interdigitating their teeth and shredding vegetative material placed between the plates. The shredded vegetative material is delivered through holes in the first plate to a weighing device in the housing.

30 Claims, 4 Drawing Sheets

SHREDDER AND SHREDDING METHOD FOR VEGETATIVE MATERIAL

BACKGROUND OF THE INVENTION

1. Field of the Invention

The present invention relates to apparatus and methods for shredding, grinding, comminuting and weighing vegetative material.

2. Description of Related Art

Herbs, tobacco and other vegetative material will often be shred or ground just before being used, in order to assure freshness of the shredded/ground material. In this specification methods and apparatus for grinding and comminuting are deemed to include methods and apparatus for shredding.

Measuring the amount of shredded/ground material is important to assure that a sufficient amount of the material is prepared. On the other hand, one ought to avoid preparing an excessive amount. While the excess might be stored for later use, this material will tend to quickly lose moisture and freshness and thus become unsatisfactory. To avoid preparing an excess, one can deliver the freshly prepared material to a scale in increments until the desired weight is achieved, but successive transfers of material to a scale is time-consuming.

While food processors, blenders and other devices can comminute vegetative material, they tend to be large and occupy significant storage space. Likewise many weighing devices exist but these can again be bulky. In addition, finding storage space for a separate grinder/shredder and weighing device can often be difficult. Moreover, often one would like to be able to easily transport these devices and use them in situations where electricity or other external power sources are unavailable.

Known weighing devices have zeroing features. For example, a container may be placed on a scale before using a zeroing or tare function. Basically, the weight of the container is eliminated and the displayed weight is compensated to indicate only the weight of the contents of the container.

See also, U.S. Pat. Nos. 4,304,363; 4,111,212; 4,605,175; 4,789,106; 5,174,403; 5,329,069; 5,386,944; 5,522,556; and 7,422,170.

SUMMARY OF THE INVENTION

In accordance with the illustrative embodiments demonstrating features and advantages of the present invention, there is provided a shredder for shredding vegetative material. The shredder has a first and second plate, the first plate being mounted in a housing. The first plate has a working face with a first plurality of teeth. The second plate has an opposing face with a second plurality of teeth interdigitated with the first plurality of teeth. The first plate and the second plate are relatively rotatable for shredding the vegetative material. A weighing device is mounted in the housing for weighing vegetative material shed from a location between the first and the second plate.

In accordance with another aspect of the invention, a method is provided that employs a first and a second plate with transverse teeth for shredding vegetative material. The first plate has a plurality of holes. The method includes the step of placing vegetative material between the first and the second plate. Another step is relatively rotating the first and the second plate to interdigitate their teeth and shred the vegetative material. The method includes the step of allowing delivery of vegetative material shredded by the teeth of the first and the second plate through the holes in the first plate.

Another step is weighing vegetative material delivered through the holes in the first plate.

By employing apparatus and methods of the foregoing type an improved shredder and shredding method is achieved. In the disclosed embodiment, a pair of circular plates can be releasably snapped together using a ball and socket joint that allows the plates to relatively rotate. Each of the plates has a number of teeth that project perpendicularly from one face of the plate. In this embodiment each plate has three annular rows of teeth arranged concentrically. When the two plates are snapped together the rows of one plate interleave with the rows on the other plate.

When the plates are relatively rotated, teeth on one plate pass between (interdigitate) with teeth of the other plate. Vegetative material caught between the interdigitating teeth will be thereby shredded or ground. The disclosed teeth are four sided prisms with two opposing corners being relatively sharp. Depending on the direction of relative rotation, one of these two sharp corners will be leading. For example, for relative clockwise rotation one of the sharp corners will be leading, but the other sharp corner will be leading for relative counterclockwise rotation.

These sharp corners are arranged so that one is on the outside and the other is on the inside of the annular row. In addition, the teeth on one plate will have an outline that is the mirror image of teeth on the other plate, when the teeth are meshed. Thus, regardless of the relative rotation of the plates (clock-wise/counterclockwise) when two teeth in adjacent rows are passing each other, one of them will have a leading sharp corner that is located alongside the corridor between the two adjacent rows.

In this embodiment, the upper plate will be rotated manually relative to the lower plate and shredded material will fall through holes in the lower plate. Specifically, the disclosed lower plate will be secured with set screws in a housing that includes a chute that delivers shredded material to a weighing device.

The device is used by separating the upper and lower plate and placing vegetative material between the plates before snapping them together. The device may then be placed on a horizontal surface so that a switch on its underside can sense this placement and zero the weighing device. Thereafter, the upper plate can be rotated and shredded material will fall through holes in lower plate onto the weighing device, which will continuously display the increasing weight. When the desired weight is reached, the user stops rotating the upper plate. In this embodiment, an optional side door in the housing can be opened to dispense the shredded material.

The disclosed embodiment has a cup-shaped cover over the upper plate. This cover can be turned manually to rotate the upper plate. Afterward, the cover can be removed and used as an ashtray.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Figure 1:
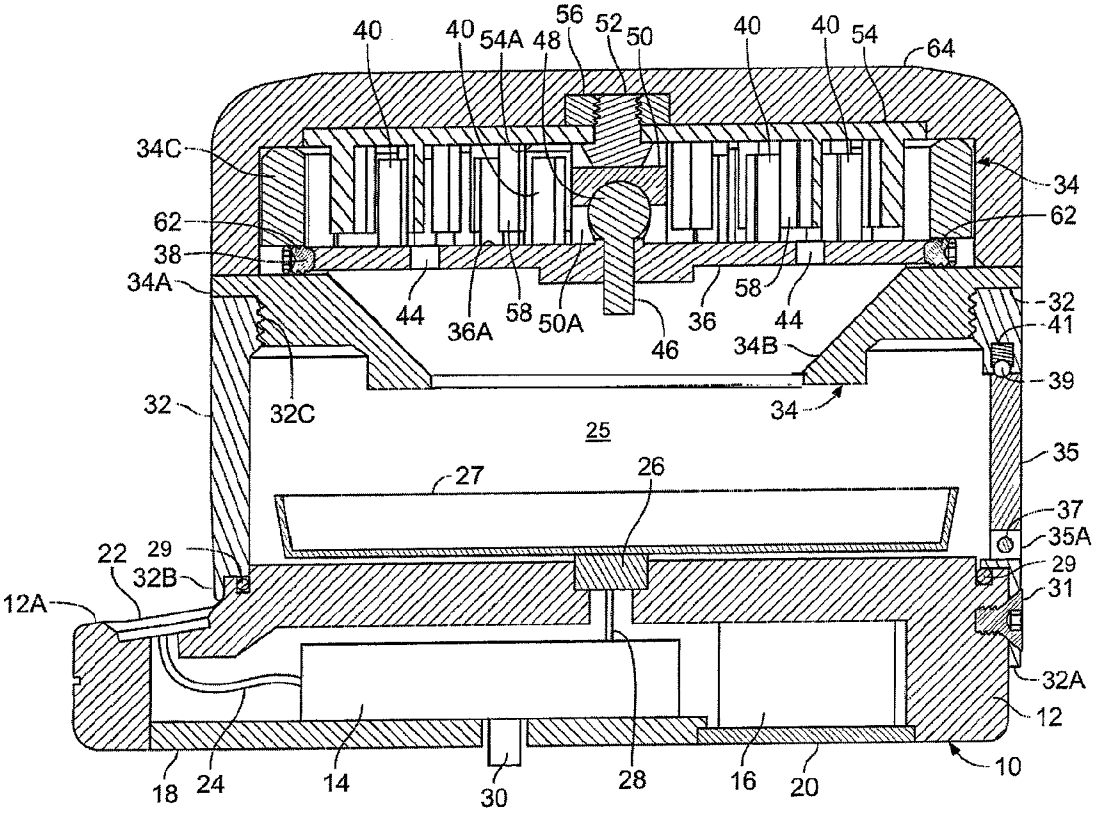
FIG. 1 is a cross-sectional, elevational view of a shredder in accordance with principles of the present invention.
Figure 2:
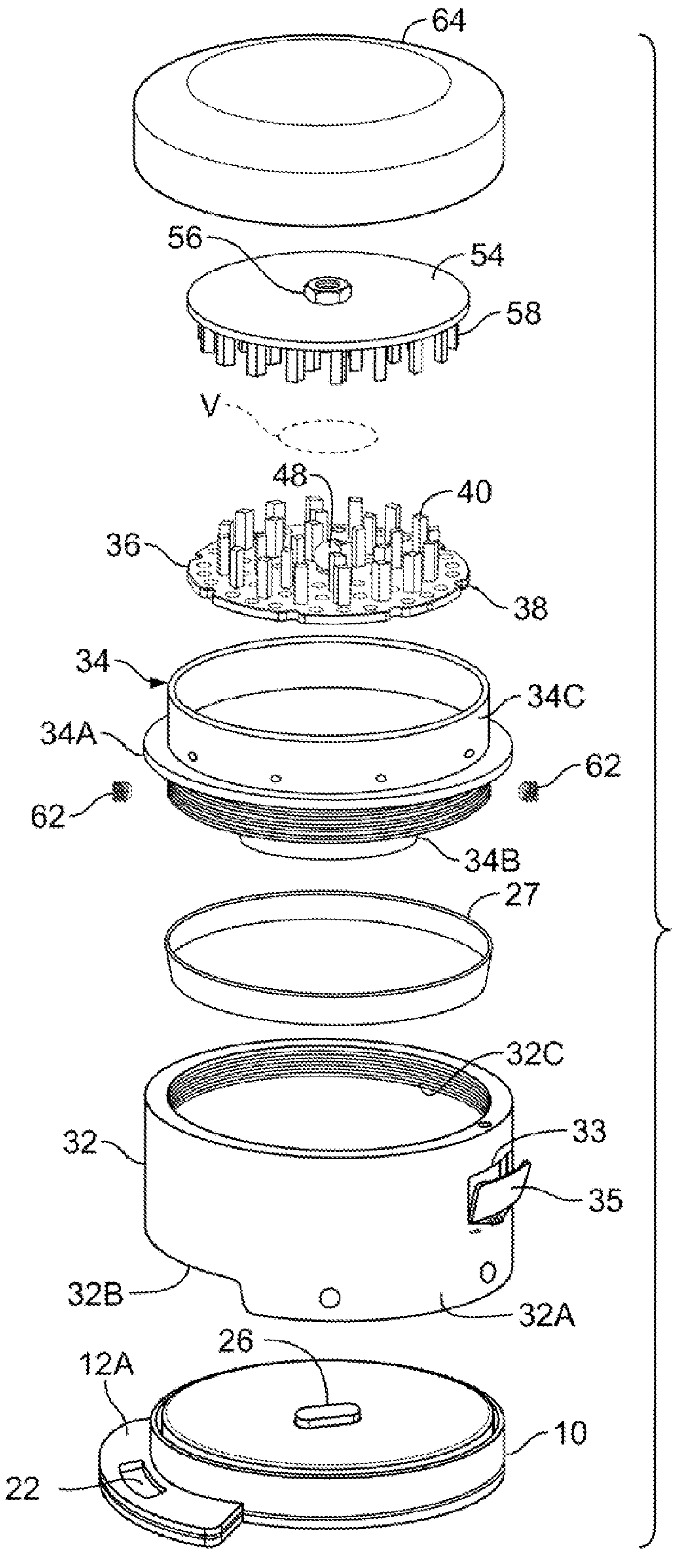
FIG. 2 is an exploded, perspective view of the shredder of FIG. 1.

Referring to FIGS. 1 and 2, the illustrated shredder includes base 10 having upper shell 12 with a cavity containing processor 14, powered by battery 16. Processor 14 can be an electronic microprocessor or microcontroller programed to act as a weighing device. The underside of shell 12 is closed by cover plate 18. Battery 16 can be installed and replaced by using removable cover 20. Switch 30 on the underside of processor 14 projects prominently through an opening in cover plate 18.

Display 22 is embedded atop radially protruding shelf 12A of shell 12. Display 22 may be an LCD or other type of display and is shown connected to processor 14 through cable 24. Transducer 26 is embedded in and protruding slightly from the top of shell 12. Transducer 26 may be piezoelectric component or other element that may be used as a weighing device. Shallow pan 27 is shown resting atop transducer 26. Transducer 26 is connected to processor 14 by wires, 28 routed through a vertical tunnel in shell 12.

Cylindrical sleeve 32 has a skirt with a relatively tall segment 32A and a relatively short segment 32B. Skirts 32A and 32B each extend approximately 180° and encircle the rim of shell 32. Sleeve 32 is secured to shell 12 by a number of screws 31, one being shown in FIG. 1. O-ring 29, in an annular groove along the rim of shell 12, effectuates a seal with the lower inside corner of sleeve 32. The upper mouth of sleeve 32 has internal threads 32C.

Sleeve 32 has an opening 33 (FIG. 2) fitted with a door 35, which has along its lower edge, C-shaped knuckles 35A that interleave with similar knuckles (not shown) on the lower edge of opening 33. Pin 37 is inserted through these knuckles and allows door 35 to swing outwardly as shown in FIG. 2. Door 35 can be held closed by ball 39, which is driven outwardly by spring 41.

Holder 34 has flange 34A above chute 34B, which chute is shown leading to compartment 25 inside sleeve 32. Chute 34B has an internal frustroconical surface and external threads engaging internal threads 32C of sleeve 32. Holder 34 has an upper cylindrical collar 34C encircling first plate 36.

Figure 3:
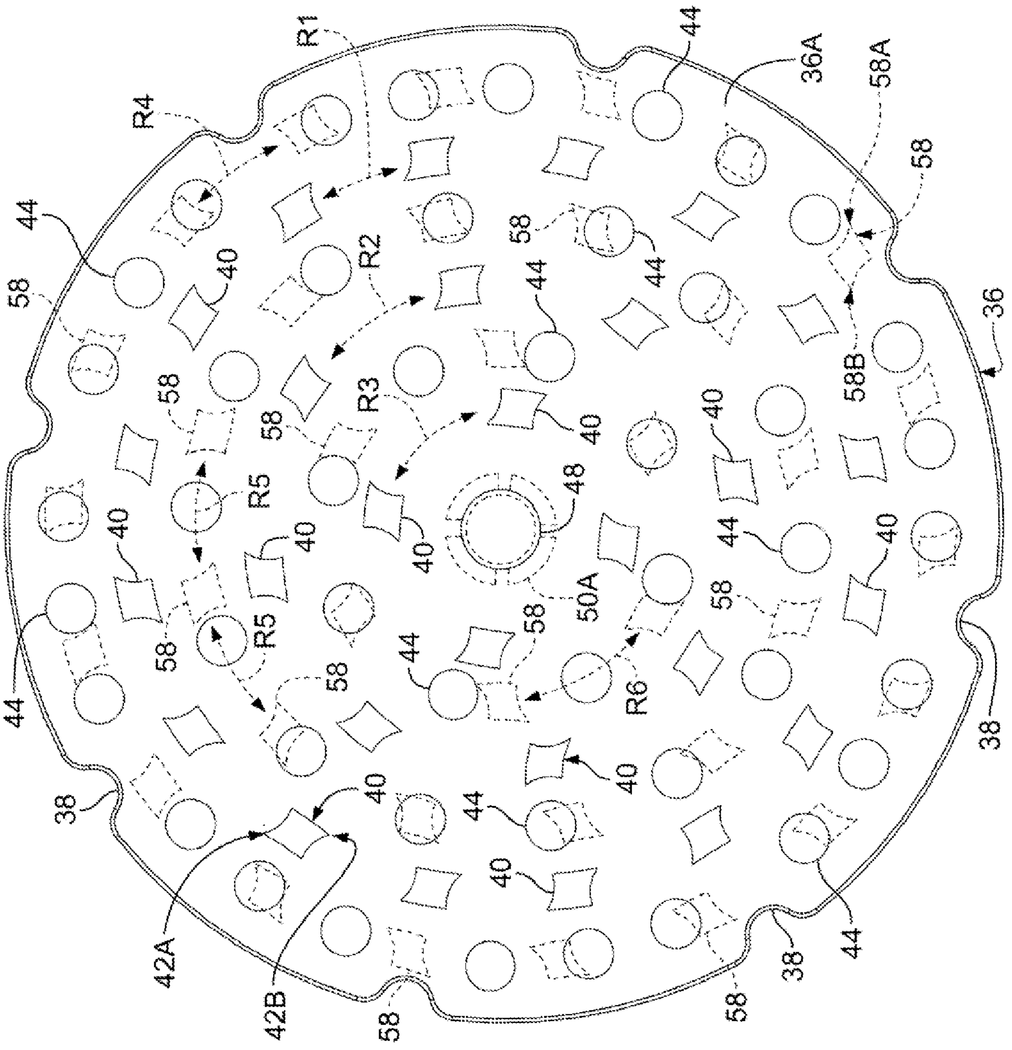
FIG. 3 is a top view of the lower plate of FIG. 1 with the teeth of the upper plate superimposed thereon and shown in phantom.
Figure 4:
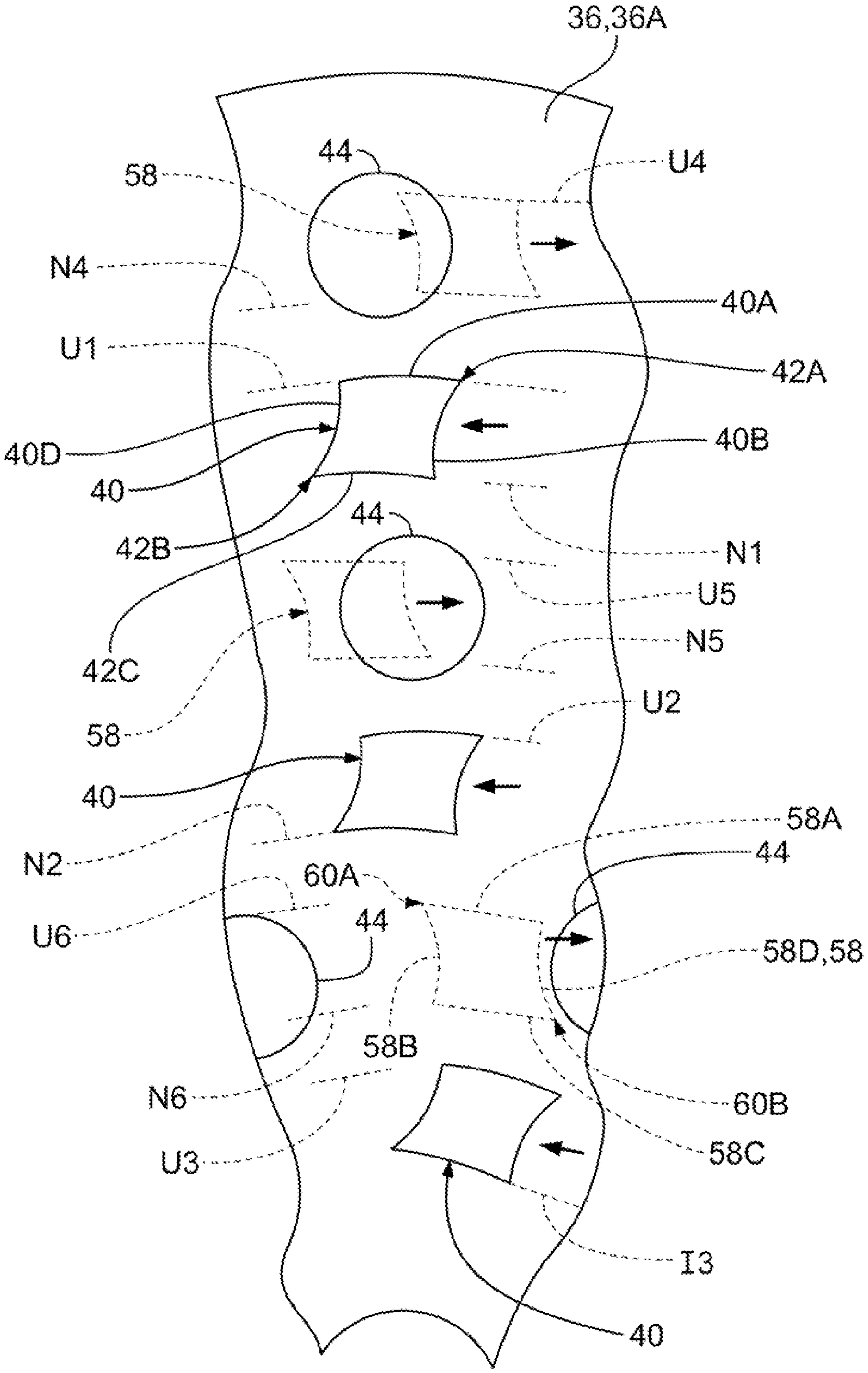
FIG. 4 is a detailed view of a fragment of the plate of FIG. 3.

Referring to FIGS. 3 and 4, first plate 36 is shown as a circular disk with eight peripheral notches 38. A number of teeth 40 in the form of four sided prisms, project perpendicularly from the upper working face 36A of plate 36. Teeth 40 are herein referred to as a first plurality of teeth. Teeth 40 are arranged in (1) an outer annular row R1 having sixteen equiangularly spaced teeth 40; (2) a middle annular row R2 having eight equiangularly spaced teeth 40; and (3) an inner annular row R3 having four equiangularly spaced teeth 40. Rows R1, R1 and R3 are circular, concentric rows having an even row to row spacing. Row R1 has an outside U1 and inside N1. Row R2 has an outside U2 and inside N2. Row R3 has an outside U3 and inside N3.

Plate 36 also has through holes 44 arranged in three circular, concentric rows as follows: (1) an outer annular row R4 having twenty four spaced holes 44 arranged in eight equiangularly spaced trios, a trio being located between each adjacent pair of notches 38; (2) a middle annular row R5 having fourteen equiangularly spaced holes 44; and (3) an inner annular row R6 having eight equiangularly spaced holes 44. Row R4 is to outside of row R1. Row R5 is between rows R1 and R2. Row R6 is between rows R2 and R3.

Referring to FIGS. 1 and 3, stem 46 is mounted in a center hole in plate 36 and supports a slightly elevated ball 48. Ball 48 snaps into cup 50, which has four slits forming four springy, in-turned fingers 50A for releasably holding the ball (i.e., a ball and socket joint). Cup 50 is welded to the tapered head of stud 52, whose threaded shank passes through a central hole in upper plate 54 and is locked in place by hex nut 56.

Plate 54 has the same thickness and outside diameter as plate 36 but lacks holes and peripheral notches (holes 44 and notches 38 of FIG. 3). In this embodiment plates 36 and 54 have a diameter of 2.5 inches (6.3 cm) and a thickness of 0.09 inch (2.3 mm), although other dimensions may be employed in other embodiments. A plurality of teeth 58 in the form of four sided prisms project perpendicularly from the lower opposing face 54A of plate 54. Teeth 58 are herein referred to as a second plurality of teeth in second plate 54.

Referring to FIGS. 3 and 4, previously mentioned teeth 58 are shown in phantom overlaying plate 36 to show the relationship among holes 44 and teeth 40 and 58. It will be appreciated that FIGS. 3 and 4 are essentially top views and so teeth 40 are illustrated from an overhead view (looking toward plate 36), while teeth 58 are illustrated from a subjacent view (looking away from plate 54). Teeth 40 and 58 have the same shape but because they point in opposite directions in FIGS. 3 and 4, teeth 40 appear as the mirror image of teeth 58.

Each of the teeth 40 have a single convex side 40A on the outside (i.e., outsides U1, U2 and U3). The other three sides 40B, 40C, and 40D are concave. Sides 40A and 40B meet at a fairly sharp angle to form an outside cutting edge 42A. Sides 40C and 40D also meet at a fairly sharp angle to form an inside cutting edge 42B. Cutting edges 42A and 42B each present a cutting angle of about 35°, although different angles may be employed in other embodiments. The other two corners of the teeth 40 are less sharp and form an angle of approximately 90°, although again, different angles may be employed in other embodiments.

Teeth 58 have the same shape as teeth 40, but appear as the mirror images in these Figures for the reasons previously noted. Specifically, each of the teeth 58 have a convex side 58A with three other concave sides 58B, 58C and 58D. Sides 58A and 58B form an outside cutting edge 60A, while sides 58C and 58D form inside cutting edge 60B. In this embodiment teeth 40 and 58 are 0.35 inch (9 mm) tall and have a thickness in the radial direction of 0.09 inch (2.3 mm), although different dimensions may be employed in other embodiments.

In FIG. 4 arrows adjacent teeth 40 and 58 indicate the relative rotation, that is, teeth 40 moving counterclockwise and teeth 58 clockwise. It will be understood that if plate 36 is stationary then this rotation would be accomplished with teeth 40 stationary and teeth 58 rotating clockwise. Of course, the relative rotations can be reversed in the manner described hereinafter.

Teeth 58 are arranged in three concentric rows that are coincident with the rows for the holes 44. Specifically, teeth 58 are arranged in: (1) outer row R4 having eighteen equiangularly spaced teeth 58; (2) middle row R5 having twelve equiangularly spaced teeth 58; and (3) inner row R6 having six equiangularly spaced teeth 40. Rows R4, R5 and R6 are circular, endless, concentric rows. With respect to teethe 58: (1) row R4 has an outside U4 and inside N; (2) row R5 has an outside U5 and inside N5; and (3) row R6 has an outside U6 and inside N6. Rows R1, R2, R3, R4, R5 and R6 have an even row to row spacing.

Referring to FIG. 1, plate 36 is mounted within collar 34C and is locked in place by set screws 62 inserted into notches 38. Consequently, plate 36 will remain stationary relative to the housing formed of elements 10, 32 and 34.

Cup-shaped cover 64 has recesses shaped to receive plate 54 and nut 56. Consequently, the turning of cover 64 will cause plate 54 to rotate. Cover 64 may be made of high-temperature plastic, ceramic, or other refractory material to allow use as an ashtray in the manner to be described presently.

To facilitate an understanding of the principles associated with the foregoing apparatus, its operation will be briefly described. With the device assembled as shown in FIG. 1, a user will remove cover 64 and plate 54. As plate 54 is lifted, cup 50 rises and its fingers 50A spread apart allowing ball 48 to snap out of the cup. The user will then insert vegetative material V (FIG. 2) atop plate 36. This vegetative material V may be herbs, tobacco, or the like.

Next, the user will reinstall plate 54, pressing downwardly to spread fingers 50A so that cup 50 snaps onto ball 48. Cover 64 will be placed over plate 54 so that hex nut 56 resides in the matching hexagonal cavity in the cover.

The user may now place base 10 on a tabletop or other horizontal surface. Consequently, switch 30 will be depressed, which will send a signal to processor 14 requesting a zeroing routine. In response, processor 14 will capture the output signal from transducer 26 and store that value as a baseline. Processor 14 will then send a signal to display 22, which will indicate a zero reading. The user may now lift and manipulate the device.

When plate 54 was snapped over plate 36, teeth 58 were thrust downwardly between teeth 40. With this downward movement vegetative material will be caught between teeth 40 and 58, stretched and partially torn or shredded. The shredding process can now begin in earnest as the user grasps housing 10/32/34 with one hand and cover 64 with the other hand. By rotating cover 64 relative to housing 10/32/34, the user will cause plate 54 to rotate relative to plate 36.

If cover 64 is rotated clockwise relative to housing 10/32/34, teeth 40 and 58 will move in the relative directions indicated in FIG. 4. (It will be understood that this relative rotation can be accomplished with one of the sets of teeth remaining stationary.) Inside cutting edge 60B of teeth 58 will then be in the leading position and will tend to drive vegetative material against the duller corner formed by sides 40A and 40D of teeth 40. Consequently, vegetative material will be caught between teeth 58 and 40, stretched, and shredded. Simultaneously, inside cutting edge 42B of teeth 40 will also be in the leading position and will tend to drive vegetative material against the duller corner formed by sides 58A and 58D. Again, vegetative material will be caught between teeth 58 and 40, stretched, and shredded.

In some cases the relative rotation will be reversed. This may occur because of user preferences, or because the user oscillates plate 54 relative to plate 36. With reverse rotation, outside cutting edge 60A of teeth 58 will then be in the leading position and will tend to drive vegetative material against the duller corner formed by sides 40B and 40C of teeth 40. Also, outside cutting edge 42A of teeth 40 will also be in the leading position and will tend to drive vegetative material against the duller corner formed by sides 58B and 58C. Again, vegetative material will be caught between teeth 58 and 40, stretched, and shredded.

As this process continues, vegetative material be shredded into smaller and smaller fragments. Eventually these fragments will be small enough to fall through holes 44 in plate 36. The shredded material is highly likely to fall through holes 44 since they are plentiful and teeth 40 and 58 tend to stir the shredded material. Also, since holes 40 and teeth 58 reside in common rows R4-R6, these teeth tend to sweep shredded material into the holes.

After falling through holes 44, the shredded material is guided by chute 34B into pan 27. Transducer 26 will respond by sending to processor 14 a signal indicating an increased weight. In response, processor 14 will send an updated signal to display 22 so that display 22 can show the increased weight value. The user will observe display 22 and if the weight value is inadequate will continue to shred the material by relatively rotating cover 64 and housing 10/32/34.

During this interval the user might place base 10 down and thereby operate switch 30. However, processor 14 is programmed to recognize that weight has been increasing and inadequate time has passed, and therefore will not perform a zeroing routine.

Eventually, sufficient material will fall into pan 27 so that transducer 26 will produce a signal causing processor 14 to show on display 22 the weight value desired by the user. The user may now open door 35, which will push detent ball 39 upwardly, compressing spring 41. When door 35 is open, ball 39 is not ejected because it is exposed through an opening smaller than the ball diameter.

With door 35 open, the user may tilt the device so that the shredded material is dispensed through opening 33. The dispensed material may either be delivered to a container or directly to an intended application. For example, if herbs were shredded, these shredded herbs may be delivered to a bowl or pot being used to prepare a dish. If tobacco was shredded, the shredded material may be directly delivered to paper that is then rolled before lighting and smoking the tobacco.

Cover 64 may be lifted, inverted and placed on a table with its open side up. In this embodiment the material of cover 64 will be refractory and therefore the cover can be used as an ashtray.

Before storing the device, a user may clean the inside of cover 64, if necessary. The user may also lift plate 54 so that cup 50 snaps off of ball 48. The user can then shake or brush out any vegetative material remaining between teeth 40 or between teeth 58. Thereafter, plate 54 and cover 64 can be replaced in the manner described previously.

If desired, one can unscrew holder 34 from sleeve 32 to gain access to compartment 25 in order to clean the compartment and pan 27. In some cases such disassembly may be done simply for the purpose of gathering the shredded material that has fallen into compartment 25.

It is appreciated that various modifications may be implemented with respect to the above described embodiments. Instead of a computer-controlled weighing device, some embodiments may use a mechanical weighing apparatus. While the above teeth are shown as perpendicular, four-sided prisms, in other embodiments the teeth can be tilted, blade-like, T-shaped, extend outwardly along a curved axis, etc. Also, the number and placement of teeth can be varied depending upon the size of the device, how fine one wishes to shred material, reliability, etc. While the teeth are shown mounted on flat plates, in some embodiments the plates may be dome shaped, with a convex side of one plate facing the concave side of the other plate. While the housing is shown made of three parts, in other embodiments the housing can be made of one, two, four or more parts. In addition, the dimensions, proportions, and shapes of the various components illustrated herein may be varied depending on the desired capacity, strength, reliability, etc. Also, depending on the requirements of strength and reliability, the materials can be made metal, plastics, ceramics, composite materials, etc.

Obviously, many modifications and variations of the present invention are possible in light of the above teachings. It is therefore to be understood that within the scope of the appended claims, the invention may be practiced otherwise than as specifically described.

The invention claimed is:

1. A shredder for shredding vegetative material, comprising:

a housing;

a first plate mounted in said housing, said first plate having a working face with a first plurality of teeth;

a second plate having an opposing face with a second plurality of teeth interdigitated with said first plurality of teeth, said first plate and said second plate being relatively rotatable for shredding said vegetative material; and a weighing device mounted in said housing for weighing vegetative material shed from a location between said first and said second plate.

2. A shredder according to claim 1 wherein said first plurality of teeth are arranged in at least one annular row on said working face, said at least one annular row having an inside and an outside.

3. A shredder according to claim 2 wherein at least some of said first plurality of teeth have (a) an inside cutting edge along the inside of said at least one annular row, and (b) an outside cutting edge along the outside of said at least one annular row.

4. A shredder according to claim 3 wherein said second plurality of teeth are arranged annularly in at least one endless row on said opposing face, at least some of said second plurality of teeth having (a) an inside cutting edge along the inside of said at least one endless row, and (b) an outside cutting edge along the outside of said at least one endless row.

5. A shredder according to claim 2 wherein at least some of said first plurality of teeth have four sides and four corners, a first and a second cutting edge being formed at an opposite pair of said four corners.

6. A shredder according to claim 2 wherein said second plurality of teeth are arranged in a plurality of concentric rows on said opposing face, said first plurality of teeth being arranged in a plurality of concentric rows on said working face.

7. A shredder according to claim 6 wherein said second plurality of teeth are transverse to said opposing face, said first plurality of teeth being transverse to said working face.

8. A shredder according to claim 1 wherein said housing has a compartment between said weighing device and said first plate, said first plate having a plurality of holes for delivering to said compartment vegetative material shredded by said first and said second plurality of teeth.

9. A shredder according to claim 8 wherein said housing has an opening leading from said compartment for allowing discharge therefrom of vegetative material shredded by said first and said second plurality of teeth.

10. A shredder according to claim 9 wherein said housing has a door for closing said opening.

11. A shredder according to claim 1 comprising:

a cover sized to fit over and engage said second plate in order to rotate said second plate by rotating said cover.

12. A shredder according to claim 11 wherein said cover is cup shaped and made of a refractory material suitable for an ashtray.

13. A shredder according to claim 1 wherein said first plate is releasably connected to said second plate.

14. A shredder according to claim 13 wherein said first and said second plate snap together.

15. A shredder according to claim 14 wherein said first and said second plate are interconnected by a ball and socket joint.

16. A shredder according to claim 1 wherein said weighing device comprises:

a transducer for producing a weight related signal;

a display; and a processor coupled to transducer and said display for generating from said weight related signal an indicating signal suitable for presentation on said display.

17. A shredder according to claim 16 wherein said processor is operable to produce a zero indication on said display at a designated time and thereafter the indicating signal being calculated relative to the weight related signal at the designated time.

18. A shredder according to claim 17 wherein said processor comprises:

a switch protruding from underneath said housing for producing a resting signal upon placement of said housing on a level surface that engages and operates said switch, upon sensing operation of said switch said processor producing the zero indication on said display.

19. A shredder according to claim 16 wherein said housing has an underside, said display projecting outwardly from said housing near its underside.

20. A method employing a first and a second plate with transverse teeth for shredding vegetative material, said first plate having a plurality of holes, the method comprising the steps of:

placing vegetative material between the first and the second plate relatively rotating the first and the second plate to interdigitate their teeth and shred the vegetative material;

allowing delivery of vegetative material shredded by the teeth of the first and the second plate through the holes in the first plate; and weighing vegetative material delivered through the holes in the first plate.

21. A method according to claim 20 wherein said first plate is mounted in a housing, the step of relatively rotating the first and the second plate being performed with the first plate remaining fixed in the housing.

22. A method according to claim 21, wherein the housing has an opening, the method including the step of:

allowing discharge through the opening of vegetative material shredded by the teeth of the first and the second plate.

23. A method according to claim 21 wherein the step of allowing delivery of vegetative material being performed by delivering vegetative material to a location inside the housing.

24. A method according to claim 23 comprising the step of:

dispensing vegetative material through an opening in the housing.

25. A method according to claim 20 employing a cover and comprising the step of:

fitting the cover over the second plate in order to engage and rotate the second plate by rotating the cover.

26. A method according to claim 25 comprising the step of:

removing the cover and using it as an ashtray.

27. A method according to claim 20 comprising the step of:

releasably connecting the first and the second plate together.

28. A method according to claim 27 comprising the step of: snapping the first and the second plate apart before the step of placing between them, vegetative material.

29. A method according to claim 20 employing a weighing device having a display and a switch, the method including the step of:

placing the weighing device on a horizontal surface in order to operate said switch, operation of said switch causing the weighing device to adjust its weight measurement as shown on the display to indicate no vegetative material is deposited on said weighing device.

30. A method according to claim 29 wherein the step of weighing vegetative material is performed to obtain a weight relative to the conditions observed when the switch was operated most recently.

* * * * *